United States Patent [19]

Aitken

[11] Patent Number: 4,940,678

[45] Date of Patent: Jul. 10, 1990

[54] RARE EARTH OXYNITRIDE GLASSES

[75] Inventor: Bruce G. Aitken, Painted Post, N.Y.

[73] Assignee: Corning Incorporated, Corning, N.Y.

[21] Appl. No.: 385,447

[22] Filed: Jul. 27, 1989

[51] Int. Cl.$^5$ .......................... C03C 3/062; C03C 3/11
[52] U.S. Cl. .......................................... 501/73; 501/56
[58] Field of Search ..................................... 501/56, 73

[56] References Cited

U.S. PATENT DOCUMENTS 4,609,631  9/1986  Messier et al. ...................... 501/56

OTHER PUBLICATIONS

Loehman, R.; "Preparation and Properties of Yttrium-Silicon-Aluminum Oxynitride Glasses", Journal of The American Ceramic Society, vol. 62, No. 9, Oct. 1979, pp. 491–494.

Lang, J. et al; "The Glassy Phase in the Lanthanide-Silicon-Aluminum-Oxygen-Nitrogen System", Mater. Sci. Monogr 1982, 10 (React solids, v2), 506–511.

Primary Examiner—Mark L. Bell
Attorney, Agent, or Firm—Clinton S. Janes, Jr.

[57] ABSTRACT

This invention relates to glasses consisting essentially, by weight, of about 35–72% $Ln_2O_3$, 5–37% $Al_2O_3$, 29–56% $SiO_2$, and 4–7.5% N. Up to about one-half of the $Ln_2O_3$ on an atomic basis may be replaced with SrO and/or BaO. A transparent glass can be formed which contains about 40–60% on a molar basis of $Ln_2O_3$+SrO and/or BaO and wherein the atomic ratio Sr and/or Ba:Sr and/or Ba+Ln >0.4.

3 Claims, No Drawings

RARE EARTH OXYNITRIDE GLASSES

BACKGROUND OF THE INVENTION

Oxynitride glasses and glass-ceramics, i.e., glass and glass-ceramic products wherein nitrogen has been substituted for a portion of the oxygen in the base composition, are known to the art. Nitridation of glasses and glass-ceramics has been observed as increasing the density, viscosity, hardness, and dielectric constant of the base materials.

U.S. Pat. No. 4,097,295 (Chyung et al.) provides a broad disclosure of $SiO_2$-based, oxynitride glasses which, being thermally crystallizable, constitute precursor materials for the production of glass-ceramic articles. Hence, $SiO_2$ and nitrogen, the latter being conjectured as present as the nitride ion $N^{-3}$, comprise at least 50% by weight of the compositions and are present in amounts of about 40-85% $SiO_2$ and 2.5-17% N. The remainder of the compositions consists of network formers and/or modifiers (defined as $M_xO_y$) which permit glass articles to be formed utilizing conventional glassmaking techniques. The patentees explicitly noted the operability of the alkali metal oxides, the oxides of the Group IIA and Group IIB elements of the Periodic Table, $B_2O_3$, and $Al_2O_3$. At least 15% of $M_xO_y$ ingredients will be present wherein $M_xO_y$ consists of 10-40% $Al_2O_3$ and 5-25% of at least one oxide selected from the group consisting of the alkali metal oxides, the oxides of the Group IIA and Group IIB elements of the Periodic Table, and $B_2O_3$.

Silicate glasses containing a rare earth metal oxide from the lanthanide series of rare earth metals are well recognized in the glass art for exhibiting high hardness and elastic modulus values. Although U.S. Pat. No. 4,097,295 makes no reference to such glasses, more recent researchers have investigated the potential for nitriding such glasses to obtain materials displaying extremely high hardness and strength values. Thus, Makishima, Mitomo, Tanaka, and Tsutsumi have published the following two articles disclosing their preparation of a lanthanum silicate glass containing about 18 atomic percent nitrogen, which corresponds to an overall approximate glass composition of $2La_2O_3 \cdot SiO_2 \cdot Si_3N_4$: "Preparation of La-Si-O-N Oxynitride Glass of High Nitrogen Content," *Yogyo Kyokaishi*, 88 [11] 701-702 (1980), and "Microhardness and Transparency of an La-Si-O-N Oxynitride Glass," *Communications of the American Ceramic Society*, C-55-56 March 1983. That glass did, indeed, demonstrate extreme hardness values, viz., a Vickers hardness of 12.0 GPa. Nevertheless, the glass required very high melting temperatures, i.e., in the neighborhood of 1700° C., and was melted in batches of only two grams. Such melting temperatures, coupled with the inherent instability of the glass, render difficult the scaling up required to provide commercially viable volumes of glass utilizing techniques and equipment relatively familiar to the glassmaking art.

Therefore, the primary objective of the present invention was to discover nitrided glass compositions exhibiting good stability containing at least one rare earth metal oxide which demonstrate high hardness values and which can be melted and formed at temperature and with equipment capable of producing large volumes of glass bodies with relative ease.

SUMMARY OF THE INVENTION

I have found that the above objective and others which will be discussed below can be achieved in nitrided glasses having compositions within strictly delimited ranges within the rare earth metal oxide-$Al_2O_3$-$SiO_2$ system. As used herein, $Ln_2O_3$ refers to a rare earth metal oxide selected from the lanthanide series of rare earth metals, viz., $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$. More specifically, the inventive glasses consist essentially, expressed in terms of weight percent on the oxide basis, of about 35-72% $Ln_2O_3$, 5-37% $Al_2O_3$, 20-56% $SiO_2$, and 4-7.5% N. Whereas the exact conversion of ranges expressed in weight percent to ranges expressed in mole percent is not mathematically possible, the following ranges provide approximations in mole percent as expressed in terms of $Ln_2O_3$, $Al_2O_3$, $SiO_2$, and $Si_3N_4$: 15-40% $Ln_2O_3$, 9-50% $Al_2O_3$, 13-60% $SiO_2$, and 10-22% $Si_3N_4$. The compositions can be melted at temperatures between 1500°-1600° C. and the inclusion of $Al_2O_3$ imparts good stability to the glasses.

The inventive glasses display high annealing points, viz., about 900°-950° C., linear coefficients of thermal expansion (25°-300° C.) between about $55-75 \times 10^{-7}$/°C., electrical resistivities at 350° C. (Log ρ) of about 11-13, dielectric constants measured at 25° C. and 100 Hz of about 12-14, and Knoop hardness values of about 600-700 $Kg/mm^2$. The wettability of the glass surface appears to decrease as nitrogen increasingly replaces oxygen. Nevertheless, the glasses are still wetted rather readily by water.

Oxynitride glasses having compositions within the above-described quaternary system were typically opaque and evidenced a gray/brown to black color. Nitrogen loss upon melting of oxynitride batches has been recognized in the art and has been ascribed to the two principal mechanisms set out below:

(1) the thermal decomposition of $Si_3N_4$ according to

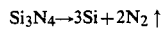
$$Si_3N_4 \rightarrow 3Si + 2N_2 \uparrow$$

(2) the oxidation of $Si_3N_4$ according to

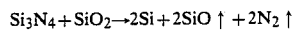
$$Si_3N_4 + SiO_2 \rightarrow 2Si + 2SiO \uparrow + 2N_2 \uparrow$$

If the loss of nitrogen is due to the second mechanism, the resultant glasses would be expected to be Si-deficient, owing to the volatility of SiO. Chemical analyses of the inventive glasses, however, have shown little, if any, evidence of loss of Si. That circumstance suggests that the observed loss of nitrogen may be due to decomposition of $Si_3N_4$. Hence, the Si metal resulting from that reaction would presumably be responsible for the opacity of the glasses.

Analyses of the inventive glasses having compositions within the above-described quaternary system have indicated that retention of nitrogen is quite high, averaging about 90% of the amount batched, and that level of retention does not appear to vary substantially as a function of bulk composition over the full extent of the system.

SrO and BaO have been substituted for up to one-half of the rare earth metal oxide on an atomic basis. Those replacements led to the observation that glasses containing about 40-60% on a molar basis of $Ln_2O_3 + SrO$ and/or BaO and wherein the atomic ratio Sr and/or Ba:Sr and/or Ba+Ln>0.4 are transparent; glasses containing less Sr and/or Ba are opaque despite the high content of nitrogen (equivalent to 10-17 mole percent $Si_3N_4$). It was further observed that compositions containing about 38% and less on a molar basis of $Ln_2O_3+$ SrO and/or BaO invariably yield brown-to-black opaque glasses. The coefficient of thermal expansion of the glasses rises as greater substitutions of SrO and/or BaO are made, resulting in values up to about $70 \times 10^{-7}/°C$.

Analyses of those glasses have indicated poorer retention of nitrogen, typically on the order of about 75% of the amount batched. Nitrogen retention decreases as increasing amounts of rare earth metal are replaced by Sr and/or Ba. With respect to the mechanism underlying the loss of nitrogen, if the relatively large losses encountered in these Sr and/or Ba-containing glasses are caused by the $Si_3N_4$ decomposition reaction discussed above, a correspondingly greater amount of Si metal would be produced during the course of melting and, hence, the glasses would be expected to be at least as opaque, if not more so, as the glasses having compositions solely within the quaternary system. The fact that the glasses are transparent, rather than opaque, indicates that the nitrogen loss mechanism must be more complicated, perhaps involving the modifying oxides.

In this context, additional glasses were prepared utilizing AlN instead of $Si_3N_4$ as the batch source of nitrogen. (The use of AlN as a batch material also resulted in greater ease of melting compositions of high $Al_2O_3$ contents.) The decomposition vapor pressure of nitrogen at a given temperature is much lower for AlN than for $Si_3N_4$. Consequently, in the presence of $SiO_2$ much less Si metal is formed from the oxidation of AlN than from the oxidation of $Si_3N_4$. Therefore, it was hypothesized that transparent glasses could be produced from compositions within the simple quaternary system where AlN constituted the batch source of nitrogen. The resulting glasses, however, appeared to be just as opaque as those prepared with $Si_3N_4$ as the batch source of nitrogen, and the loss of nitrogen appeared to be about equivalent to those compositions containing $Si_3N_4$. The above phenomena underscore the lack of certainty as to the mechanism underlying the loss of nitrogen.

DESCRIPTION OF PREFERRED EMBODIMENTS

Table I records a number of approximate compositions, expressed in terms of weight percent on the oxide basis, illustrating the instant invention. Inasmuch as it is not definitely known with which cation(s) the nitrogen is combined, it is merely tabulated as nitrogen and the oxygen≈nitrogen correction factor reported in accordance with customary glass analysis practice. The actual batch ingredients can comprise any materials, either oxides or other compounds, which, when melted together, will be converted to the desired oxide in the proper proportions. However, batch materials will most preferably be selected which are free of readily reducible components, e.g., carbonates, to avoid oxidation of nitrides. Whereas other nitrogen-containing compounds may be employed, depending upon the cation components of the glass desired, in the compositions recited in Table I, $Si_3N_4$ and/or AlN comprised the source of nitrogen.

The batch ingredients were compounded, ballmilled together to assist in achieving a homogeneous melt, and charged in molybdenum crucibles. Because of the strongly reducing atmosphere generated by nitride, a platinum crucible cannot be used. However, crucibles fabricated from other materials such as graphite and boron nitride are also operable. The crucibles were introduced into an induction-heated furnace operating between about 1500°-1600° C. and having an atmosphere of flowing nitrogen gas, and the batches melted for about 2-5 hours. The melts were refined by holding the crucibles at a temperature slightly above the liquidus of the glass, and then either cooled within the crucible by cutting off the power to the furnace, while maintaining the nitrogen atmosphere, or poured into preheated graphite molds to form glass slabs which were annealed in a nitrogen atmosphere. Samples were cut from the slabs for use in measuring physical properties.

It will be appreciated that the above description reflects laboratory experimentation only. Thus, the compositions recited in Table I are capable of being melted and formed in larger scale commercial units having facilities for utilizing an inert atmosphere. (Although a surrounding atmosphere of nitrogen gas or gaseous ammonia is preferred, other inert gases such as argon may be employed.)

Table IA reports the compositions of Table I in terms of mole percent on the oxide basis with the nitrogen content being supplied as $Si_3N_4$ and/or AlN.

TABLE I

|  | 1 | 2 | 3 | 4 | 5 | 6 | 7 |
|---|---|---|---|---|---|---|---|
| $La_2O_3$ | 59.4 | 59.7 | 59.9 | 63.3 | 59.7 | 67.2 | 67.8 |
| $Al_2O_3$ | 14.8 | 17.9 | 20.9 | 16.8 | 21.8 | 6.3 | 11.7 |
| $SiO_2$ | 29.3 | 25.9 | 22.7 | 23.0 | 21.6 | 29.4 | 23.3 |
| N | 5.4 | 4.4 | 5.3 | 4.5 | 4.7 | 4.4 | 4.3 |
|  | 108.9 | 108.9 | 108.8 | 107.6 | 107.8 | 107.3 | 107.1 |
| O≈N | −8.9 | −8.9 | −8.8 | −7.6 | −7.8 | −7.3 | −7.1 |
|  | 100.0 | 100.0 | 100.0 | 100.0 | 100.0 | 100.0 | 100.0 |

|  | 8 | 9 | 10 | 11 | 12 | 13 |
|---|---|---|---|---|---|---|
| $La_2O_3$ | 68.1 | 67.7 | 58.9 | 59.4 | 36.1 | 35.5 |
| $Al_2O_3$ | 14.2 | 6.3 | 7.9 | 7.9 | 7.5 | 11.1 |
| $SiO_2$ | 20.6 | 29.5 | 37.2 | 37.4 | 26.1 | 23.5 |
| BaO | — | — | — | — | 33.6 | 33.4 |
| N | 4.3 | 5.4 | 6.1 | 7.2 | 5.2 | 5.3 |
|  | 107.2 | 108.9 | 110.1 | 111.9 | 108.7 | 108.8 |
| O≈N | −7.2 | −8.9 | −10.1 | −11.9 | −8.7 | −8.8 |
|  | 100.0 | 100.0 | 100.0 | 100.0 | 100.0 | 100.0 |

TABLE IA

|  | 1 | 2 | 3 | 4 | 5 | 6 | 7 |
|---|---|---|---|---|---|---|---|
| $La_2O_3$ | 29.2 | 30.6 | 31.9 | 33.5 | 31.1 | 34.3 | 37.3 |
| $Al_2O_3$ | 23.3 | 29.3 | 35.6 | 28.4 | 36.3 | 10.2 | 20.6 |
| $SiO_2$ | 31.3 | 23.4 | 15.3 | 23.5 | 17.6 | 41.9 | 27.8 |
| $Si_3N_4$ | 16.2 | 16.7 | 17.2 | 14.6 | 14.9 | 13.6 | 14.3 |

|  | 8 | 9 | 10 | 11 | 12 | 13 |
|---|---|---|---|---|---|---|
| $La_2O_3$ | 38.8 | 36.5 | 27.4 | 29.1 | 16.9 | 17.1 |
| $Al_2O_3$ | 25.9 | 10.8 | 11.7 | 12.4 | 11.2 | 17.1 |
| $SiO_2$ | 20.6 | 35.0 | 43.9 | 37.2 | 23.4 | 16.2 |
| $Si_3N_4$ | 14.7 | 17.7 | 17.1 | 21.3 | 14.7 | 15.5 |
| BaO | — | — | — | — | 33.8 | 34.2 |

Table II records determinations of annealing point (A.P.), linear coefficient of thermal expansion (Exp.) over the temperature range 25°-300° C. in terms of $\times 10^{-7}/°C.$, Knoop hardness (Knoop) in terms of kg/mm², dielectric constant at 25° C., 100 Hz (K), and Log electrical resistivity at 350° C. (Log ρ) as measured on several of the above glasses utilizing techniques conventional in the glass art.

TABLE II

|       | 4    | 5    | 6    | 12   | 13   |
|-------|------|------|------|------|------|
| A.P.  | 920  | 902  | 950  | 930  | 921  |
| Exp.  | 62.6 | 58.9 | —    | 71.3 | 73.4 |
| Knoop | 697  | 697  | 639  | —    | 614  |
| K     | 13.8 | 12.9 | 15.2 | 13.6 | 13.2 |
| Log ρ | 11.8 | 12.6 | 12.0 | 12.2 | 12.4 |

I claim:

1. A glass consisting essentially, expressed in terms of weight percent on the oxide basis, of 35.5–68.1% $Ln_2O_3$, wherein $Ln_2O_3$ consists of at least one rare earth metal oxide selected from the lanthanide series of rare earth metals, 6.3–21.8% $Al_2O_3$, 20.6–37.4% $SiO_2$, 4.3–7.2% N and 0–33.6% BaO.

2. A glass according to claim 1 wherein up to one-half of said $Ln_2O_3$ on an atomic basis is replaced with SrO and/or BaO.

3. A glass according to claim 2 which exhibits transparency and contains about 40–60% on a molar basis of $Ln_2O_3$ + SrO and/or BaO and wherein the atomic ratio Sr and/or Ba:Sr and/or Ba+Ln > 0.4.

* * * * *